US011078784B2

(12) United States Patent
Coates

(10) Patent No.: US 11,078,784 B2
(45) Date of Patent: Aug. 3, 2021

(54) DYNAMIC TRANSDUCER NORMALIZATION

(71) Applicant: Halliburton Energy Services, Inc., Houston, TX (US)

(72) Inventor: Richard Timothy Coates, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 86 days.

(21) Appl. No.: 16/595,617

(22) Filed: Oct. 8, 2019

(65) Prior Publication Data
US 2020/0116018 A1 Apr. 16, 2020

Related U.S. Application Data

(60) Provisional application No. 62/746,399, filed on Oct. 16, 2018.

(51) Int. Cl.
E21B 49/00 (2006.01)
G01V 1/34 (2006.01)
E21B 47/085 (2012.01)
E21B 47/0224 (2012.01)
E21B 47/12 (2012.01)
E21B 44/00 (2006.01)

(52) U.S. Cl.
CPC ........ *E21B 49/003* (2013.01); *E21B 47/0224* (2020.05); *E21B 47/085* (2020.05); *G01V 1/34* (2013.01); *E21B 44/00* (2013.01); *E21B 47/12* (2013.01); *E21B 49/005* (2013.01); *G01V 2210/54* (2013.01)

(58) Field of Classification Search
USPC .......................................... 702/16
See application file for complete search history.

(56) References Cited

U.S. PATENT DOCUMENTS 4,870,627 A 9/1989 Hsu et al.
5,001,677 A * 3/1991 Masters .................. G01V 1/30
367/68

(Continued)

OTHER PUBLICATIONS

International Search Report and Written Opinion for Application No. PCT/US2019/055682 dated Jan. 30, 2020.

*Primary Examiner* — Paul D Lee
(74) *Attorney, Agent, or Firm* — Benjamin Ford; C Tumey Law Group PLLC

(57) ABSTRACT

A method may comprise recording a first reflected waveform with a first transducer to form a first data set from a first excitation, recording a second reflected waveform with a second transducer to form a second data set from a second excitation, estimating a first sensitivity correction factor for the first data set, applying the first sensitivity correction factor to at least a portion of the first data set to form a first sensitivity corrected data set. The method may further comprise estimating a second sensitivity correction factor for the second data set, applying the second sensitivity correction factor to at least a portion of the second data set to form a second sensitivity corrected data set, stacking the first sensitivity corrected data set amplitudes and forming a first image, stacking the second sensitivity corrected data set amplitudes and forming a second image, and comparing the images.

20 Claims, 7 Drawing Sheets

(56) References Cited

U.S. PATENT DOCUMENTS

| | | | |
|---|---|---|---|
| 2006/0287596 A1* | 12/2006 | Johnson | A61B 8/14 600/437 |
| 2007/0156359 A1 | 7/2007 | Varsamis et al. | |
| 2009/0084176 A1* | 4/2009 | Hassan | G01V 1/50 73/152.57 |
| 2013/0262061 A1* | 10/2013 | Laake | G06T 5/003 703/6 |
| 2016/0291189 A1* | 10/2016 | Collins | E21B 49/00 |
| 2016/0341842 A1 | 11/2016 | Bammi et al. | |
| 2017/0082767 A1 | 3/2017 | Jesus et al. | |
| 2017/0115423 A1* | 4/2017 | Hori | G01V 1/50 |
| 2017/0248002 A1 | 8/2017 | Frisch et al. | |
| 2017/0322332 A1* | 11/2017 | Cooper | G01V 1/306 |
| 2020/0124757 A1* | 4/2020 | Zheng | G01V 1/30 |

\* cited by examiner

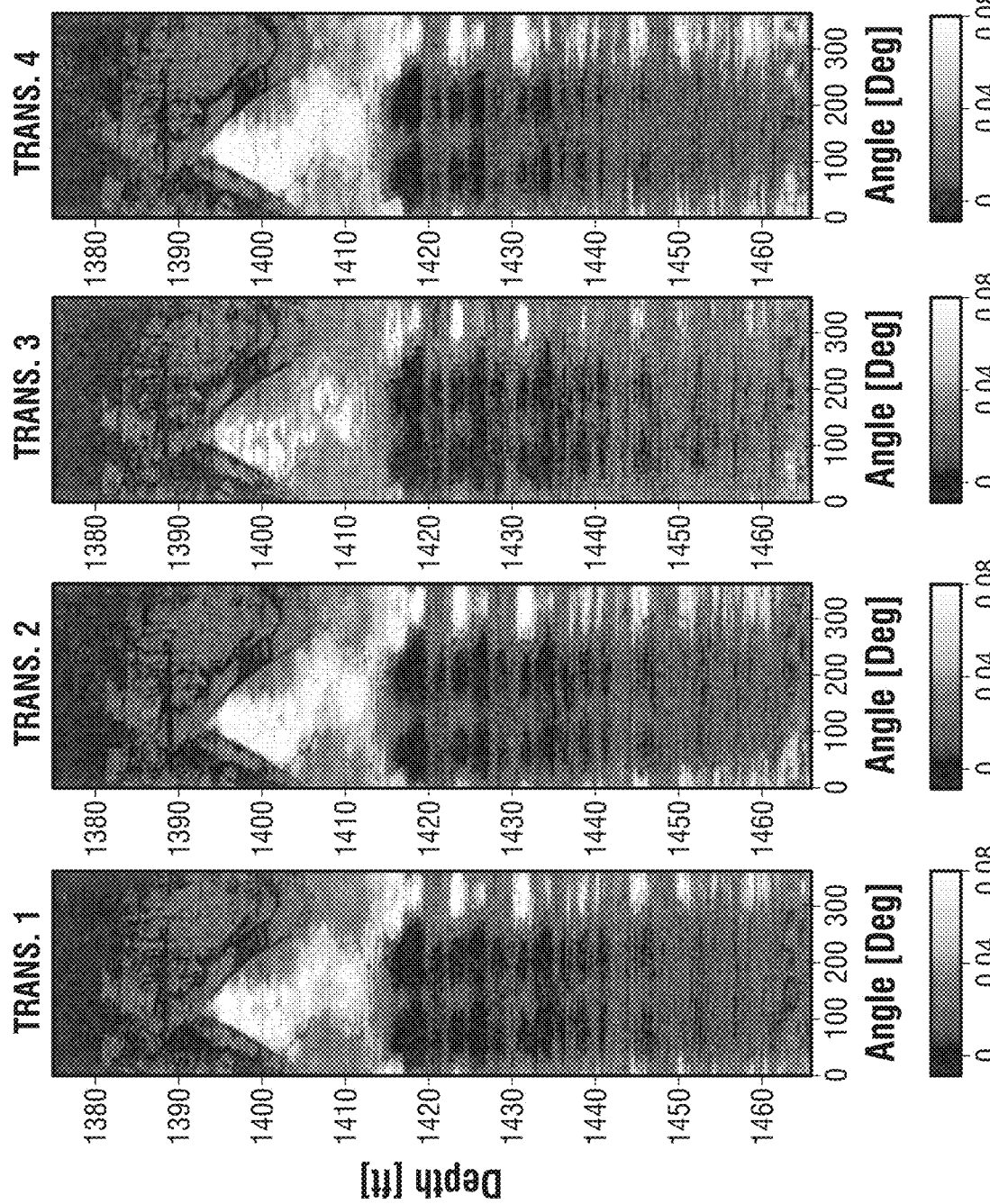

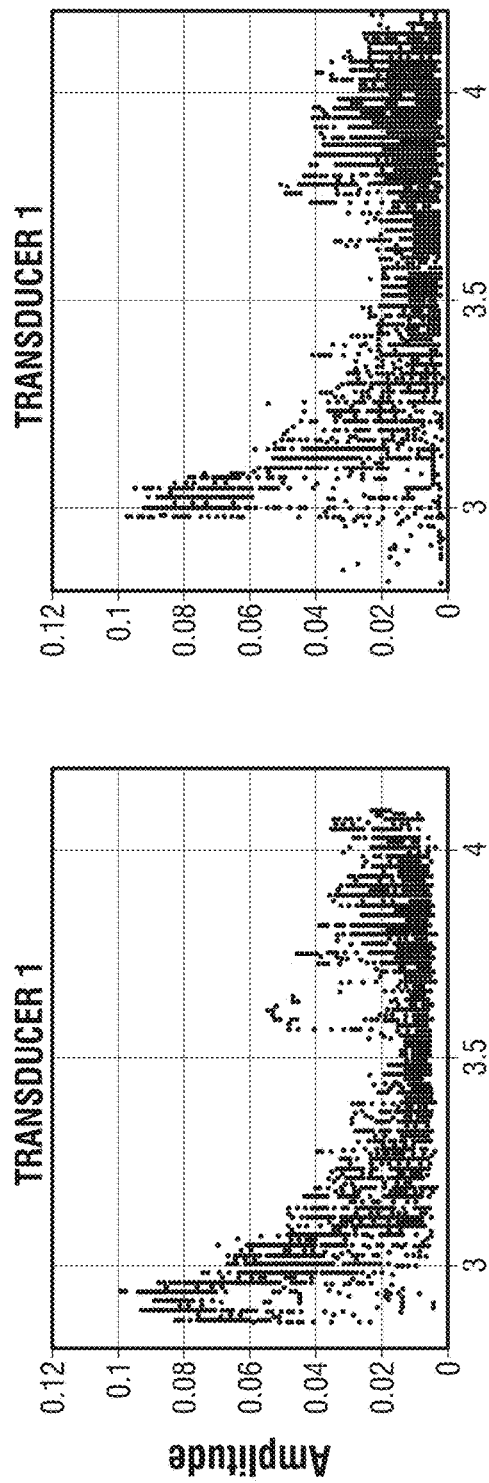
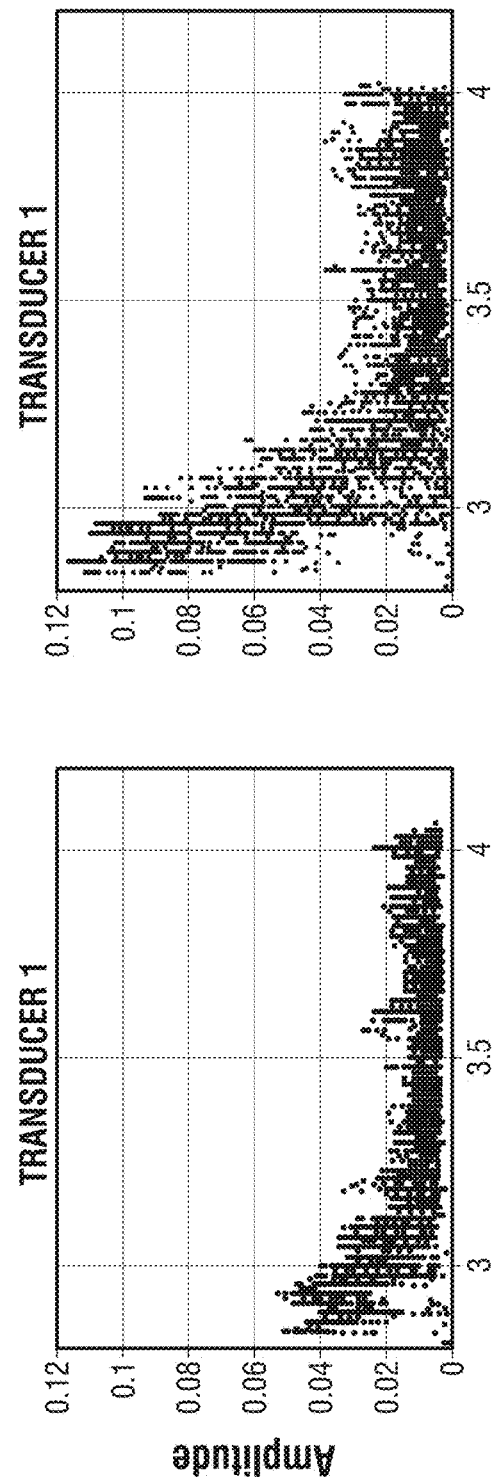

DYNAMIC TRANSDUCER NORMALIZATION

BACKGROUND

Wellbores drilled into subterranean formations may enable recovery of desirable fluids (e.g., hydrocarbons) using any number of different techniques. Currently, properties of subterranean formations surrounding the borehole may be determined using measurements made with suitable sensors mounted on the bottom hole assembly behind the drill bit. One technique for identifying properties of a subterranean formations, borehole, wellbore, and/or the like may be performed using ultrasonic measurement operations.

During ultrasonic operations an ultrasonic pressure wave may be transmitted from a transducer, which may reflect off a borehole wall and be recorded. Measurements of the reflection may be recorded as a series of amplitudes at sequential times. These sequences may be utilized to calculate travel times and reflection amplitude of the ultrasonic wave downhole. During measurement operations, even though each transducer surveys the same section of borehole wall, and hence the average reflection amplitudes may be the same, this may not always be the case. This may be due to the fact that transducers may differ in output efficiency and reception sensitivity; which may be the result of slight differences in their construction and manufacture.

BRIEF DESCRIPTION OF THE DRAWINGS

These drawings illustrate certain aspects of some examples of the present disclosure, and should not be used to limit or define the disclosure.

FIG. 4A-4D illustrate raw amplitude images from four transducers;

FIGS. 5A-5D are graphs that plot raw amplitudes as a function of stand-off distance from the four transducers;

DETAILED DESCRIPTION

This disclosure may generally relate to downhole tools and, more particularly, to a bottom hole assembly measurement system configured for correcting measurements taken by a transducer. Specifically, methods and systems may be used to determine a sensitivity correction factor for each transducer disposed within a well measurement system. The sensitivity correction factor may be applied to recorded data to produce a corrected ultrasonic image that provides more accurate measurements of the borehole.

Figure 1:
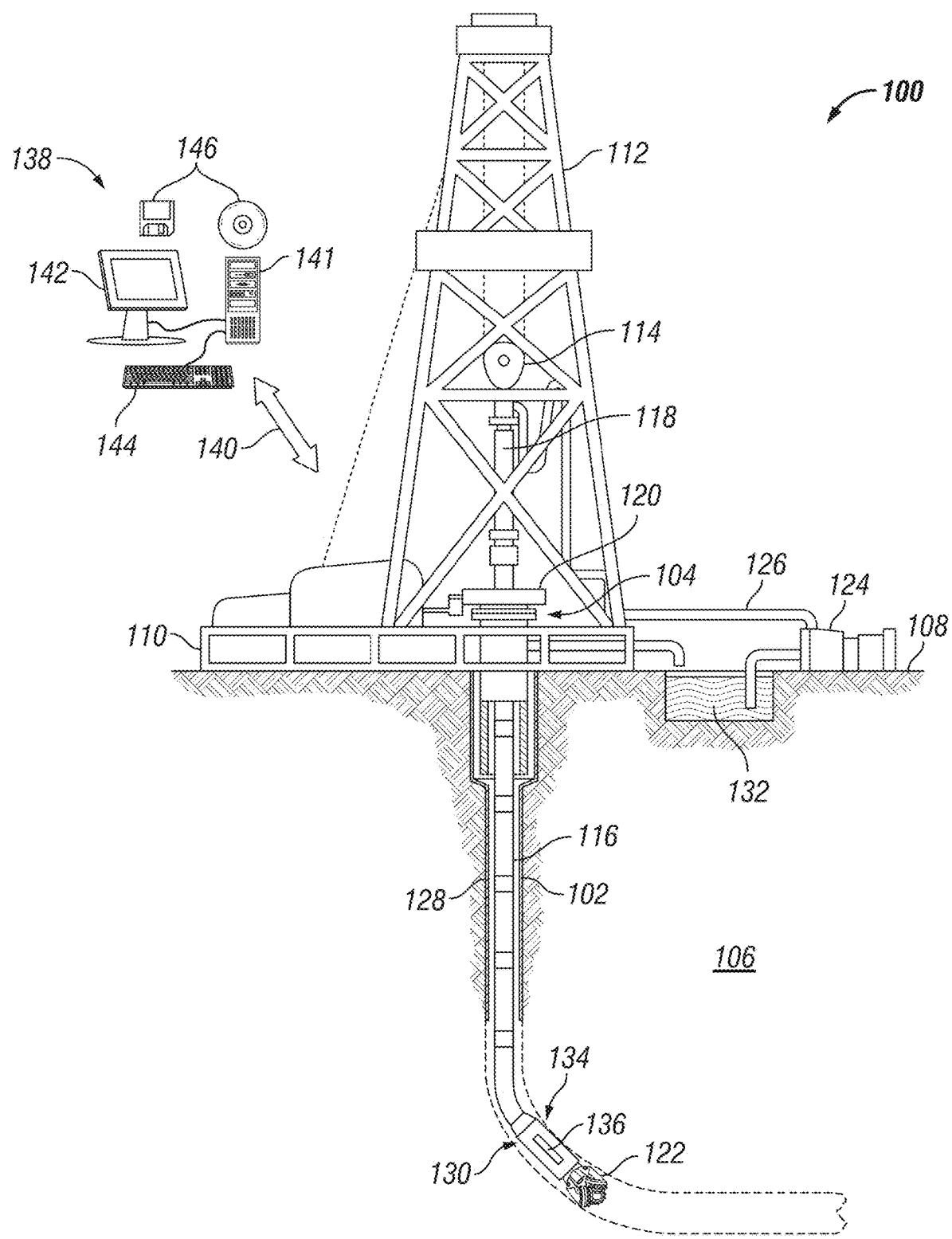
FIG. 1 illustrates an example of a drilling system.

FIG. 1 illustrates an example of a drilling system 100. As illustrated, wellbore 102 may extend from a wellhead 104 into a subterranean formation 106 from a surface 108. Generally, wellbore 102 may include horizontal, vertical, slanted, curved, and other types of wellbore geometries and orientations. Wellbore 102 may be cased or uncased. In examples, wellbore 102 may include a metallic member. By way of example, the metallic member may be a casing, liner, tubing, or other elongated steel tubular disposed in wellbore 102.

As illustrated, wellbore 102 may extend through subterranean formation 106. As illustrated in FIG. 1, wellbore 102 may extend generally vertically into the subterranean formation 106, however wellbore 102 may extend at an angle through subterranean formation 106, such as horizontal and slanted wellbores. For example, although FIG. 1 illustrates a vertical or low inclination angle well, high inclination angle, or horizontal placement of the well and equipment may be possible. It should further be noted that while FIG. 1 generally depicts land-based operations, those skilled in the art may recognize that the principles described herein are equally applicable to subsea operations that employ floating or sea-based platforms and rigs, without departing from the scope of the disclosure.

As illustrated, a drilling platform 110 may support a derrick 112 having a traveling block 114 for raising and lowering drill string 116. Drill string 116 may include, but is not limited to, drill pipe and coiled tubing, as generally known to those skilled in the art. A kelly 118 may support drill string 116 as it may be lowered through a rotary table 120. A drill bit 122 may be attached to the distal end of drill string 116 and may be driven either by a downhole motor and/or via rotation of drill string 116 from surface 108. Without limitation, drill bit 122 may include, roller cone bits, PDC bits, natural diamond bits, any hole openers, reamers, coring bits, and the like. As drill bit 122 rotates, it may create and extend wellbore 102 that penetrates various subterranean formations 106. A pump 124 may circulate drilling fluid through a feed pipe 126 through kelly 118, downhole through interior of drill string 116, through orifices in drill bit 122, back to surface 108 via annulus 128 surrounding drill string 116, and into a retention pit 132.

With continued reference to FIG. 1, drill string 116 may begin at wellhead 104 and may traverse wellbore 102. Drill bit 122 may be attached to a distal end of drill string 116 and may be driven, for example, either by a downhole motor and/or via rotation of drill string 116 from surface 108. Drill bit 122 may be part of bottom hole assembly 130 at distal end of drill string 116. Bottom hole assembly 130 may further include tools for look-ahead resistivity applications. As will be appreciated by those of ordinary skill in the art, bottom hole assembly 130 may be a measurement-while drilling (MWD) or logging-while-drilling (LWD) system.

Bottom hole assembly 130 may include any number of tools, transmitters, and/or receivers to perform downhole measurement operations. For example, as illustrated in FIG. 1, bottom hole assembly 130 may include a measurement assembly 134. It should be noted that measurement assembly 134 may make up at least a part of bottom hole assembly 130. Without limitation, any number of different measurement assemblies, communication assemblies, battery assemblies, and/or the like may form bottom hole assembly 130 with measurement assembly 134. Additionally, measurement assembly 134 may form bottom hole assembly 130 itself. In examples, measurement assembly 134 may include at least one transducer 136, which may be disposed at the surface of measurement assembly 134. It should be noted that transducer 136 may also be referred to as a "pinger" and/or a transducer.

Without limitation, bottom hole assembly 130 may be connected to and/or controlled by information handling system 138, which may be disposed on surface 108. Without limitation, information handling system 138 may be disposed down hole in bottom hole assembly 130. Processing of information recorded may occur down hole and/or on surface 108. Processing occurring downhole may be transmitted to surface 108 to be recorded, observed, and/or further analyzed. Additionally, information recorded on information handling system 138 that may be disposed down hole may be stored until bottom hole assembly 130 may be brought to surface 108. In examples, information handling system 138 may communicate with bottom hole assembly 130 through a communication line (not illustrated) disposed in (or on) drill string 116. In examples, wireless communication may be used to transmit information back and forth between information handling system 138 and bottom hole assembly 130. Information handling system 138 may transmit information to bottom hole assembly 130 and may receive as well as process information recorded by bottom hole assembly 130. In examples, a downhole information handling system (not illustrated) may include, without limitation, a microprocessor or other suitable circuitry, for estimating, receiving and processing signals from bottom hole assembly 130. Downhole information handling system (not illustrated) may further include additional components, such as memory, input/output devices, interfaces, and the like. In examples, while not illustrated, bottom hole assembly 130 may include one or more additional components, such as analog-to-digital converter, filter, and amplifier, among others, that may be used to process the measurements of bottom hole assembly 130 before they may be transmitted to surface 108. Alternatively, raw measurements from bottom hole assembly 130 may be transmitted to surface 108.

Any suitable technique may be used for transmitting signals from bottom hole assembly 130 to surface 108, including, but not limited to, wired pipe telemetry, mud-pulse telemetry, acoustic telemetry, and electromagnetic telemetry. While not illustrated, bottom hole assembly 130 may include a telemetry subassembly that may transmit telemetry data to surface 108. At surface 108, pressure transducers (not shown) may convert the pressure signal into electrical signals for a digitizer (not illustrated). The digitizer may supply a digital form of the telemetry signals to information handling system 138 via a communication link 140, which may be a wired or wireless link. The telemetry data may be analyzed and processed by information handling system 138.

As illustrated, communication link 140 (which may be wired or wireless, for example) may be provided that may transmit data from bottom hole assembly 130 to an information handling system 138 at surface 108. Information handling system 138 may include a personal computer 141, a video display 142, a keyboard 144 (i.e., other input devices), and/or non-transitory computer-readable media 146 (e.g., optical disks, magnetic disks) that may store code representative of the methods described herein. In addition to, or in place of processing at surface 108, processing may occur downhole.

As discussed below, methods may be utilized by information handling system 138 to determine properties of subterranean formation 106. Information may be utilized to produce an image, which may be generated into, one, two or three-dimensional models of subterranean formation 106. These models may be used for well planning, (e.g., to design a desired path of wellbore 102). Additionally, they may be used for planning the placement of drilling systems within a prescribed area. This may allow for the most efficient drilling operations to reach a subsurface structure. During drilling operations, measurements taken within wellbore 102 may be used to adjust the geometry of wellbore 102 in real time to reach a geological target. Measurements collected from bottom hole assembly 130 of the formation properties may be used to steer drilling system 100 toward a subterranean formation 106. Optionally, these measurements may be used to plan well completion operations, including but not limited to placement of packers, hydraulic fracturing, cementing, acidizing or the placement of mud-loss mitigation treatments. Optionally, these measurements may be used for reservoir or over-burden characterization purposes.

Figure 2:
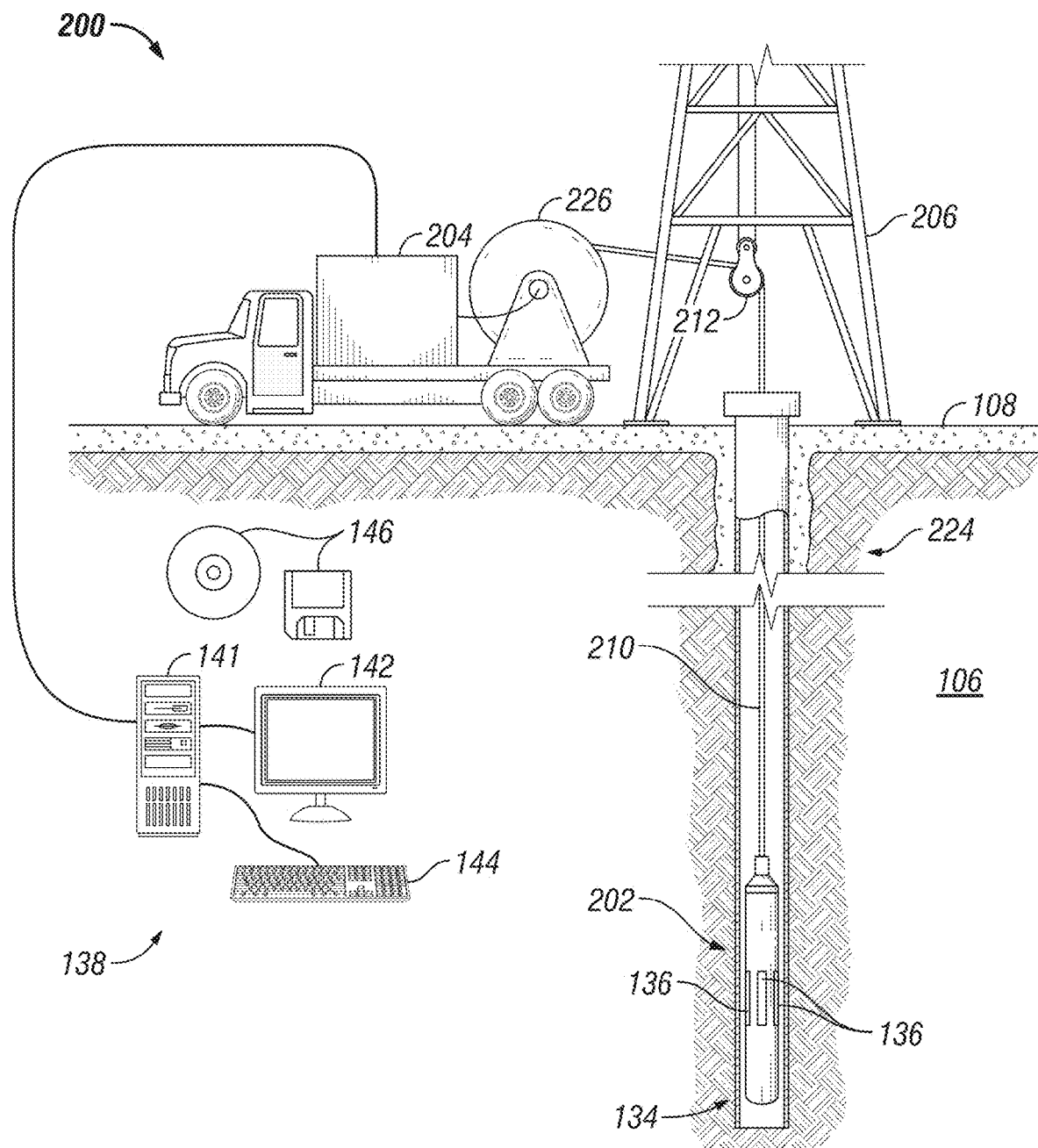
FIG. 2 illustrates an example of a well measurement system.

FIG. 2 illustrates a cross-sectional view of an example of a well measurement system 200. As illustrated, well measurement system 200 may include downhole tool 202 attached a vehicle 204. In examples, it should be noted that downhole tool 202 may not be attached to a vehicle 204. Downhole tool 202 may be supported by rig 206 at surface 108. Downhole tool 202 may be tethered to vehicle 204 through conveyance 210. Conveyance 210 may be disposed around one or more sheave wheels 212 to vehicle 204. Conveyance 210 may include any suitable means for providing mechanical conveyance for downhole tool 202, including, but not limited to, wireline, slickline, coiled tubing, pipe, drill pipe, downhole tractor, or the like. In examples, conveyance 210 may provide mechanical suspension, as well as electrical and/or optical connectivity, for downhole tool 202. Conveyance 210 may include, in some instances, a plurality of electrical conductors and/or a plurality of optical conductors extending from vehicle 204, which may provide power and telemetry. In examples, an optical conductor may utilize a battery and/or a photo conductor to harvest optical power transmitted from surface 108. Conveyance 210 may include an inner core of seven electrical conductors covered by an insulating wrap. An inner and outer steel armor sheath may be wrapped in a helix in opposite directions around the conductors. The electrical and/or optical conductors may be used for communicating power and telemetry between vehicle 204 and downhole tool 202. Information from downhole tool 202 may be gathered and/or processed by information handling system 138. For example, signals recorded by downhole tool 202 may be stored on memory and then processed by downhole tool 202. The processing may be performed real-time during data acquisition or after recovery of downhole tool 202. Processing may alternatively occur downhole or may occur both downhole and at surface. In examples, signals recorded by downhole tool 202 may be conducted to information handling system 138 by way of conveyance 210. Information handling system 138 may process the signals, and the information contained therein may be displayed for an operator to observe and stored for future processing and reference. Information handling system 138 may also contain an apparatus for supplying control signals and power to downhole tool 202.

Systems and methods of the present disclosure may be implemented, at least in part, with information handling system 138. While shown at surface 108, information handling system 138 may also be located at another location, such as remote from borehole 224. Information handling system 138 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 138 may be a personal computer 141, a network storage device, or any other suitable device and may vary in size, shape, performance, functionality, and price. Information handling system 138 may include random access memory (RAM), one or more processing resources such as a central processing unit (CPU) or hardware or software control logic, ROM, and/or other types of nonvolatile memory. Additional components of the information handling system 138 may include one or more disk drives, one or more network ports for communication with external devices as well as various input and output (I/O) devices, such as a keyboard 144, a mouse, and a video display 142. Information handling system 138 may also include one or more buses operable to transmit communications between the various hardware components. Furthermore, video display 142 may provide an image to a user based on activities performed by personal computer 141. For example, producing images of geological structures created from recorded signals. By way of example, video display unit may produce a plot of depth versus the two cross-axial components of the gravitational field and versus the axial component in borehole coordinates. The same plot may be produced in coordinates fixed to the Earth, such as coordinates directed to the North, East and directly downhole (Vertical) from the point of entry to the borehole. A plot of overall (average) density versus depth in borehole or vertical coordinates may also be provided. A plot of density versus distance and direction from the borehole versus vertical depth may be provided. It should be understood that many other types of plots are possible when the actual position of the measurement point in North, East and Vertical coordinates is taken into account. Additionally, hard copies of the plots may be produced in paper logs for further use.

Alternatively, systems and methods of the present disclosure may be implemented, at least in part, with non-transitory computer-readable media 146. Non-transitory computer-readable media 146 may include any instrumentality or aggregation of instrumentalities that may retain data and/or instructions for a period of time. Non-transitory computer-readable media 146 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 206 includes a load cell (not shown) which may determine the amount of pull on conveyance 210 at the surface of borehole 224. Information handling system 138 may include a safety valve (not illustrated) which controls the hydraulic pressure that drives drum 226 on vehicle 204 which may reel up and/or release conveyance 210 which may move downhole tool 202 up and/or down borehole 224. The safety valve may be adjusted to a pressure such that drum 226 may only impart a small amount of tension to conveyance 210 over and above the tension necessary to retrieve conveyance 210 and/or downhole tool 202 from borehole 224. The safety valve is typically set a few hundred pounds above the amount of desired safe pull on conveyance 210 such that once that limit is exceeded, further pull on conveyance 210 may be prevented.

As illustrated in FIG. 2, downhole tool 202 may include measurement assembly 134. It should be noted that measurement assembly 134 may make up at least a part of downhole tool 202. Without limitation, any number of different measurement assemblies, communication assemblies, battery assemblies, and/or the like may form downhole tool 202 with measurement assembly 134. Additionally, measurement assembly 134 may form downhole tool 202 itself. In examples, measurement assembly 134 may include any number of transducers 136, which may be disposed at or near the surface of measurement assembly 134. Without limitation, there may be four transducers 136 that may be disposed ninety degrees from each other. However, it should be noted that there may be any number of transducers 136 disposed along bottom hole assembly 130 at any degree from each other.

Figure 3:
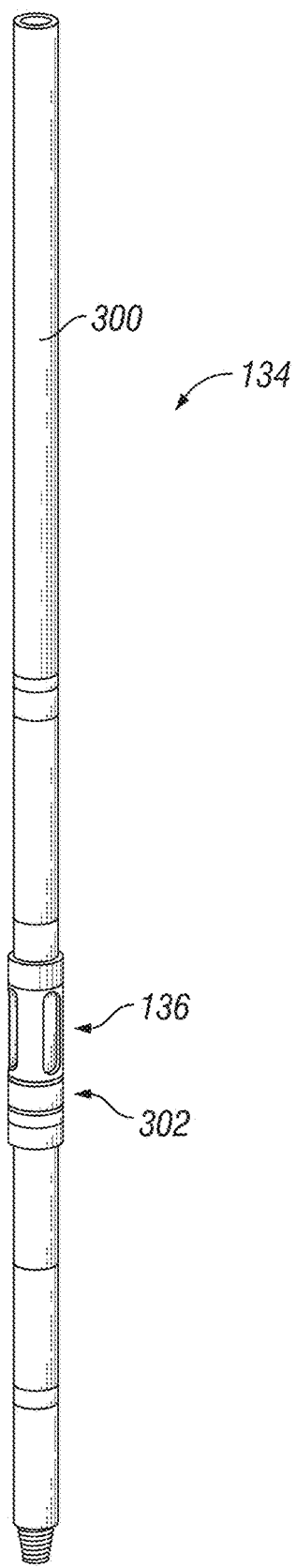
FIG. 3 illustrates an example of a measurement assembly.

FIG. 3 illustrates a close up view of an example of measurement assembly 134. As illustrated, measurement assembly 134 may include at least one battery section 300 and at least one instrument section 302. Battery section 300 may operate and function to enclose and/or protect at least one battery that may be disposed in battery section 300. Without limitation, battery section 300 may also operate and function to power measurement assembly 134. Specifically, battery section 300 may power at least one transducer 136, which may be disposed at any end of battery section 300 in instrument section 302.

Instrument section 302 may house at least one transducer 136. In other examples, instrument section 30 may house two or more transducers 136 spaced around the circumference of the instrument section 302. However, examples may include more or less than four of the transducers 136. Transducers 136 may function and operate to generate and record excitations within a borehole. For example, during operations, transducer 136 may transmit an excitation into wellbore 102 (e.g., referring to FIG. 1). Without limitation, the excitation may be in the form of a pressure pulse, current, electromagnetic field, radio frequency, and/or any other suitable medium. This may allow for transducer 136 to be an ultrasonic device, acoustic device, electromagnetic device, radio frequency device, and/or the like. In examples, may be made of piezo-ceramic crystals, or optionally magnetostrictive materials or other materials that generate an acoustic pulse when activated electrically or otherwise. In one or more examples, transducers 136 may also include backing materials and matching layers. Additionally, transducer 136 may include coils, antennas, and/or the like. It should be noted that transducers 136 and/or instrument section 302 may be removable and replaceable, for example, in the event of damage or failure.

During operations, in examples where transducer 136 may emit a pressure wave, specifically an ultrasonic pressure pulse wave, the pressure pulse may have a frequency range, for example from 50 kHz~500 kHz. In some examples, the center of the frequency range may be around 250 kHz. It should be noted that the pulse signal may be emitted with different frequency content. Recordings and/or measurements taken by transducer 136 may be transmitted to information handling system 138 by any suitable means, as discussed above. Transmission may be performed in real-time (transmitted to the surface via mud-pulse, wired-pipe or other telemetry) or post-drill (from data stored in the tool memory and recovered at the surface during tripping).

In examples, transducers 136 may further sense and record the transmission of the excitation. The excitation may travel from transducer 136 and reflect off a borehole wall. The reflected excitation is defined as an echo, which is recorded by transducer 136. Without limitation, transducers 136 may measure the excitation as it travels from transducer 136 and is reflected back to transducer 136 as an echo.

Measurements may be used to form images of the surrounding borehole and/or subterranean formation. To generate these images, measurement assembly 134 may utilize one or more transducers 136 positioned at varying azimuths around the circumference of measurement assembly 134. In examples, each transducer 136 may operate and function independently emitting an excitation and detecting its reflection from the borehole wall as a reflected echo.

The amplitude of the received echo at each transducer 136 may be stacked into composite spatial bins or pixels (e.g., of 1- or 2-degree width and ¼ inch (0.6 cm) height) at each depth). Stacking may be defined as taking the mean, or median, or harmonic mean, or trimmed-mean (where the larger and smaller outliers are discarded) of the values of all the reflection amplitude measurements (or at least a portion of the reflection amplitude measurements) falling into each pixel. This list of definitions of the term stacking should not be taken to be exhaustive and those skilled in the art could easily derive alternative means of averaging. However, irrespective of the stacking method used the resulting image may be a sum of contributions from two or more transducers.

FIGS. 4A-4D illustrate the resulting images of recorded echoes from simulated data for each transducer 136. In the illustrated example, four of the transducers 136 were used to record echoes. Despite care to calibrate each transducer 136 during manufacture of measurement assembly 134 (e.g., referring to FIG. 3), it is known that each transducer 136 may have varying sensitivities. FIGS. 4A-4D show raw amplitude data for 90 feet (27 meters) of borehole for each individual transducer 136. FIG. 4C illustrates data from a lower amplitude. During measurement operations, the image from each transducer 136 represent a map of the same spatial distribution of physical properties of the borehole wall. Thus, the difference in the images may be caused by variations in the sensitivities of each individual transducer 136 (e.g., referring to FIG. 3).

FIGS. 5A-5C illustrate another way of visualizing the data shown in FIGS. 4A-4D. FIGS. 5A-5C are graph plots, where the echo amplitude has been plotted as a function of the corresponding estimated borehole radius (or equivalently as a function of the estimated reflection travel-time) for a depth segment of the borehole. The graph illustrates a systematic variation in the apparent amplitude of the echo due to a variation in the sensitivity of transducer 136 (e.g., referring to FIG. 1). Specifically, FIG. 5C shows a graph where the measured amplitude of the echo is not as sensitive as the same echo measured and graphed in FIGS. 5A, 5B, and 5D.

Figure 6:
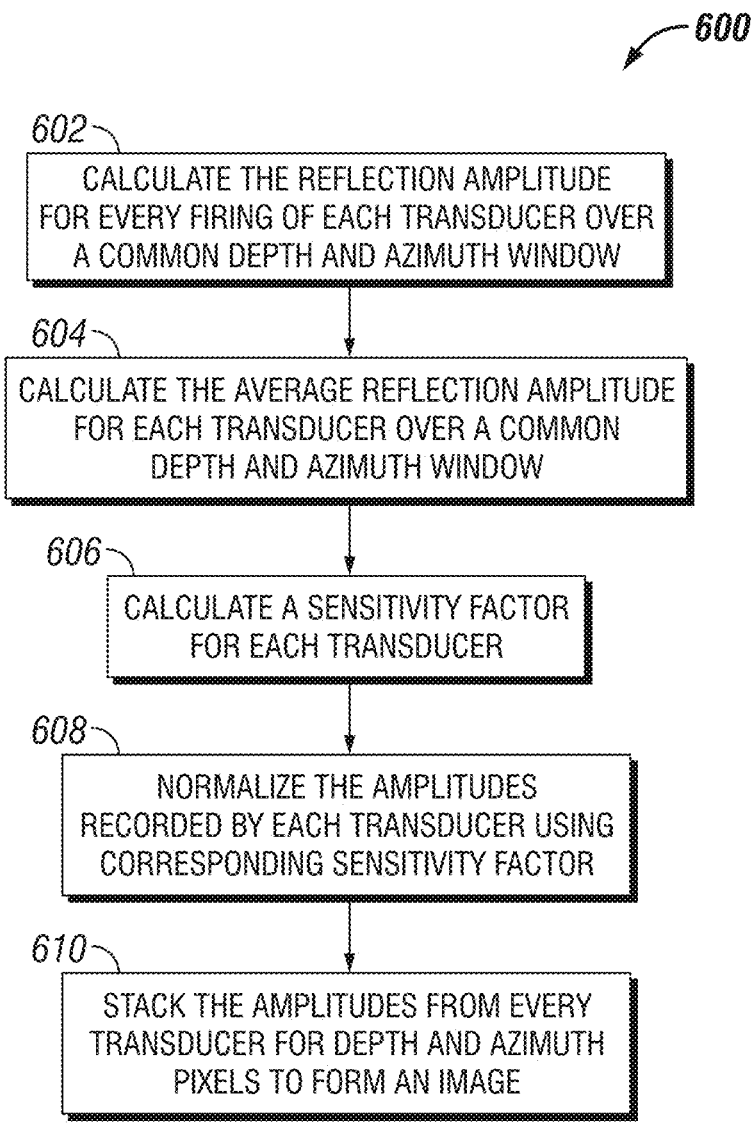
FIG. 6 is a workflow for correcting images.
Figures 7A, 7B, 7C, 7D:
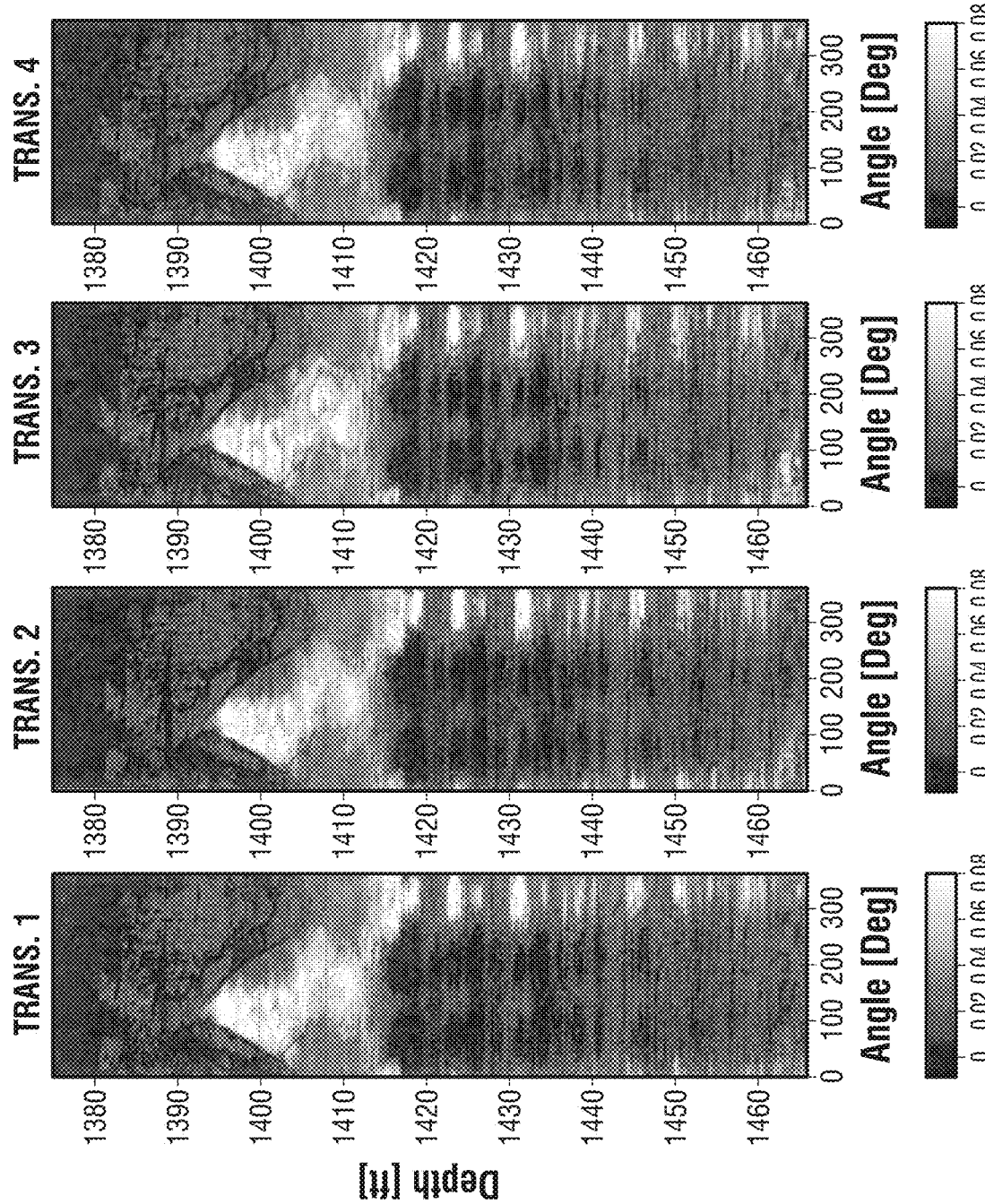
FIG. 7A-7D is corrected reflection amplitude images for the four transducers.

Combining the images without correction for varying transducer 136 sensitivity may reduce the resulting quality. FIG. 6 illustrates an example of a workflow 600 for calibrating images. Workflow 600 begins with block 602 by calculating the reflection amplitude for every firing of each transducer 136 over a common depth and azimuth window. For example, during measurement operations, the travel time of the excitation from transmission to recording of the echo may be recorded. This information may lead to determining a radius of the borehole, which may be derived by the fluid sound speed, which itself may be optionally calculated from the data. Calculation of the borehole radius may be performed by utilizing a known distance, for example the inner diameter of drill string 116, and identifying a mud speed such that:

$$\text{time·speed+tool } OD = \text{borehole } ID \quad (1)$$

In examples, amplitudes from a restricted range of an estimated borehole radius may be used in further steps below to calculate the sensitivity for each transducer 136, this has the advantage of minimizing the influence of noise or mis-identified echoes. The restricted range of estimated borehole radii may be defined as a window. The window may specify the measurements that may be used to calculate the sensitivity for each transducer 136. Without limitation, the window is user defined and may be based at least in part on maximum or mean amplitudes from echoes, expected borehole radii based on drill bit size, or echo travel time.

The operations in block 604 may also be performed in any number of suitable ways. As described, the function and operation of block 604 calculates the average reflection amplitude for each transducer 136 over a common depth and azimuth window. For example, the average reflection amplitude for each transducer may be calculated over a common depth segment for all azimuths recorded (360 degrees). In other views, the segment may not cover every azimuth (for example, a range from 0-90 degrees may be used) and the depths may not be continuous. For example, data from every n-th rotation of the tool, or from rotations chosen at random.

Additionally, calculating an "average reflection echo amplitude" may be performed by any suitable mathematical operations. For example, the mean, harmonic mean, median and mode of a data set of recorded echo amplitudes may produce an "average reflection echo amplitude." Without limitation, mathematical operations may also be "trimmed means" (where the larger and smaller outliers are discarded), or the least-squares mean (defined as the square-root of the mean of the squares of the values), or the least-N mean (analogous to least-squares except the value is raised to the N-the power and then the N-th root is taken) etc.

In one or more cases, "average reflection echo amplitude" may be defined as a raw reflection-echo amplitude. However, this does not allow for the fact each average reflection echo amplitude may be measured from a reflection from a different distance. Due to attenuation and geometrical spreading, pulse amplitudes are known to decrease with range. A more precise measurement may compensate or partially compensate for the range or travel time. For example, dividing the raw amplitude by a function of distance or utilizing a narrow range of distances (e.g. between 3 and 3.25 inches (7 cm-9 cm)).

A sensitivity scale factor may then be calculated in block 606 by dividing the average reflection amplitude for each transducer by the sum of the average reflection amplitudes for all the transducers 136. Alternatively, the sensitivity scale factor may be calculated by dividing the average reflection amplitude for each transducer 136 by the average reflection amplitude of one specified transducer 136.

In addition, average reflection echo amplitudes may be reduced by factors not associated with transducer 136 or the reflection coefficient at the borehole wall. For example, recording a non-specular reflection caused by eccentering of measurement assembly 134 in wellbore 102. These complicating factors may be compensated for by other deterministic or statistical methods. This compensation may be carried out before, or after, the transducer sensitivities are calculated and applied. If the transducer sensitivity correction is carried out before compensation for these other complicating factors, one is in effect assuming that the influence of the other complicating factor is averaged out over a sufficiently large calculation window. By estimating borehole radius through an average reflection echo amplitude or any other suitable means may allow for the determination of a sensitivity correction factor for each transducer 136.

The sensitivity scale factor calculated in block 606 is then used to normalize the amplitudes recorded by each transducer 136 using the corresponding sensitivity factor in block 608. For example, a compensation for the varying sensitivity of each transducer 136 may be performed. This compensation may be carried out by dividing the amplitude recorded for each firing of a transducer 136 by the sensitivity scale factor for the corresponding scale factor for that transducer. The application factor may be applied to all the remaining amplitudes acquired.

In one or more cases, sensitivity correction factors may be calculated at one time. For example, at the beginning of a drilling run and then applied over the full remaining depth of the borehole or length of the drilling run. Additionally, the calculation may be performed close to the surface, or at depth. However, this may not address changes in sensitivity due to pressure, temperature, mud-weight, or transducer "aging" effects. In examples, the sensitivity correction factors may be recalculated at a specific depth or distance traversed in wellbore 102 (e.g., referring to FIG. 1). For example, a user may recalculate the sensitivity correction factors at every N-feet (where N might be 100 feet (30.5 meters)) as measurement assembly 134 (e.g., referring to FIG. 1) traverses wellbore 102 and then apply the updated sensitivity correction factors over the next M-feet of drilling (or other motion). Without limitation, the sensitivity correction factors may be recalculated at every X-minutes (where X might be 60 minutes) and then apply the updated sensitivity correction factors over the next Y-minutes of drilling (or other motion). In examples, the sensitivity correction factors may be continuously updated, and the latest values applied at each time. Without limitation, sensitivity correction factors may be calculated and applied to data previously recorded and stored in measurement assembly 134 and recovered when measurement assembly 134 returns to the surface, or the sensitivity correction factors may be automatically calculated and applied to the data as it is recorded downhole. The data with a sensitivity correction factor applied may be defined as corrected data that may further be summed.

In block 610 the amplitudes are stacked from every transducer 136 for depth and azimuth pixels to form the image. Stacking may be performed as described above. In one or more cases, the stacked data may be processed into an image that each transducer 136 (e.g., referring to FIG. 1) may produce. For example, the results from workflow 600 are illustrated in FIGS. 7A-7D. Each Figure of 7A-7D is for an individual transducer 136. As illustrated in FIGS. 7A-7D, the measured amplitudes show very little difference in the created images. Thus, the sensitivity correction factor has been correctly applied to each data set for each transducer 136.

It will be appreciated by those of ordinary skill in the art, exemplary examples of the system and individual devices of the present disclosure may be used in a variety of subterranean applications, including imaging. Exemplary examples of the system and devices may be introduced into a subterranean formation and utilized to image a borehole and the surrounding formation. While the preceding discussion is directed to the use of downhole imaging, those of ordinary skill in the art will also appreciate that it may be desirable to utilize other types of imaging in the marine field, medical field, aerospace field, and defense field in accordance with examples of the present disclosure.

It should be understood that, although individual examples may be discussed herein, the present disclosure covers all combinations of the disclosed examples, including, without limitation, the different component combinations, method step combinations, and properties of the system.

Statement 1. A method may comprise recording a first reflected waveform with a first transducer to form a first data set from a first excitation, recording a second reflected waveform with a second transducer to form a second data set from a second excitation, estimating a first sensitivity correction factor for the first data set, applying the first sensitivity correction factor to at least a portion of the first data set to form a first sensitivity corrected data set, estimating a second sensitivity correction factor for the second data set, applying the second sensitivity correction factor to at least a portion of the second data set to form a second sensitivity corrected data set, stacking the first sensitivity corrected data set amplitudes and forming a first image, stacking the second sensitivity corrected data set amplitudes and forming a second image, and comparing the first image and the second image.

Statement 2. The method of statement 1, further comprising calculating the first sensitivity correction factor and the second sensitivity correction factor at a beginning of a drilling run or end of the drilling run.

Statement 3. The method of statements 1 or 2, further comprising calculating the first sensitivity correction factor and the second sensitivity correction factor is applied over any length of a drilling run.

Statement 4. The method of statements 1-3, further comprising updating the first sensitivity correction factor and the second sensitivity correction factor at a designated depth.

Statement 5. The method of statements 1-4, further comprising updating the first sensitivity correction factor and the second sensitivity correction factor over a drilling run at any designated depth.

Statement 6. A method may comprise disposing a downhole tool into a borehole. The downhole tool may comprise a measurement assembly, wherein the measurement assembly comprises a first transducer and a second transducer. The method may further comprise transmitting a first excitation from the first transducer and a second excitation from the second transducer, recording a first reflected waveform with the first transducer to form a first data set from the first excitation, recording a second reflected waveform with the second transducer to form a second data set from the second excitation, estimating a first sensitivity correction factor for the first data set, applying the first sensitivity correction factor to at least a portion of the first data set to form a first sensitivity corrected data set, estimating a second sensitivity correction factor for the second data set, applying the second sensitivity correction factor to at least a portion of the second data set to form a second sensitivity corrected data set, stacking the first sensitivity corrected data set amplitudes to form a first image, stacking the second sensitivity corrected data set amplitudes to form a second image, and comparing the first image and the second image, and displaying the first image and the second image at a common depth and an azimuth window.

Statement 7. The method of statement 6, further comprising calculating the first sensitivity correction factor and the second sensitivity correction factor at a beginning of a drilling run or end of the drilling run Statement 8. The method of statements 6 or 7, further comprising calculating the first sensitivity correction factor and the second sensitivity correction factor is applied over any length of a drilling run.

Statement 9. The method of statements 6-8, further comprising updating the first sensitivity correction factor and the second sensitivity correction factor at a designated depth.

Statement 10. The method of statements 6-9, further comprising updating the first sensitivity correction factor and the second sensitivity correction factor over a drilling run at any designated depth.

Statement 11. The method of statements 6-10, wherein the first excitation and the second excitation are a pressure pulse.

Statement 12. A system may comprise a measurement assembly. The measurement assembly may comprise a first transducer connected to the measurement assembly and configured to transmit a first excitation and a second transducer connected to the measurement assembly and configured to transmit a second excitation. The system may further comprise an information handling system configured to record a first reflected waveform with the first transducer to form a first data set from the first excitation, record a second reflected waveform with the second transducer to form a second data set from the second excitation, estimate a first sensitivity correction factor for the first data set, apply the first sensitivity correction factor to at least a portion of the first data set to form a first sensitivity corrected data set, estimate a second sensitivity correction factor for the second data set, apply the second sensitivity correction factor to at least a portion of the second data set to form a second sensitivity corrected data set, stack the first sensitivity corrected data set amplitudes to form a first image, stack the second sensitivity corrected data set amplitudes to form a second image, and compare the first image and the second image.

Statement 13. The system of statement 12, wherein the first excitation and the second excitation is a pressure pulse.

Statement 14. The system of statements 12 or 13, wherein the information handling system is further configured to display the first image and the second image at a common depth and an azimuth window.

Statement 15. The system of statements 12-14, wherein the information handling system is further configured to identify a borehole radius from a fluid sound speed calculation.

Statement 16. The system of statements 12-15, wherein the information handling system is further configured to calculate the first sensitivity correction factor and the second sensitivity correction factor at a designated depth.

Statement 17. The system of statements 12-16, wherein the information handling system is further configured to calculate the first sensitivity correction factor and the second sensitivity correction factor before beginning a drilling run or after the drilling run.

Statement 18. The system of statements 12-17, wherein the information handling system is further configured to re-calculate the first sensitivity correction factor and the second sensitivity correction factor over a drilling run at any designated depth.

Statement 19. The system of statements 12-18, further comprising a conveyance, wherein the measurement assembly is connected to the conveyance.

Statement 20. The system of statement 19, wherein the conveyance comprises a wireline, a slickline, coiled tubing, a drill pipe, or a downhole tractor.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
    recording a first reflected waveform with a first transducer to form a first data set from a first excitation;
    recording a second reflected waveform with a second transducer to form a second data set from a second excitation;
    averaging the first data set to form an average reflection amplitude of the first transducer;
    averaging the second data set to form an average reflection amplitude of the second transducer;
    estimating a first sensitivity correction factor for the first data set by dividing the average reflection amplitude of the first transducer by the sum of the average reflection amplitude of the first transducer and average reflection amplitude of the second transducer;
    applying the first sensitivity correction factor to at least a portion of the first data set to form a first sensitivity corrected data set;
    estimating a second sensitivity correction factor for the second data set by dividing the average reflection amplitude of the second transducer by the sum of the average reflection amplitude of the first transducer and average reflection amplitude of the second transducer;
    applying the second sensitivity correction factor to at least a portion of the second data set to form a second sensitivity corrected data set;
    stacking the first sensitivity corrected data set amplitudes and forming a first image;
    stacking the second sensitivity corrected data set amplitudes and forming a second image; and comparing the first image and the second image.

2. The method of claim 1, further comprising calculating the first sensitivity correction factor and the second sensitivity correction factor at a beginning of a drilling run or end of the drilling run.

3. The method of claim 1, further comprising calculating the first sensitivity correction factor and the second sensitivity correction factor is applied over any length of a drilling run.

4. The method of claim 1, further comprising updating the first sensitivity correction factor and the second sensitivity correction factor at a designated depth.

5. The method of claim 1, further comprising updating the first sensitivity correction factor and the second sensitivity correction factor over a drilling run at any designated depth.

6. A method comprising:
disposing a downhole tool into a borehole, wherein the downhole tool comprises:
  a measurement assembly, wherein the measurement assembly comprises a first transducer and a second transducer;
transmitting a first excitation from the first transducer and a second excitation from the second transducer;
recording a first reflected waveform with the first transducer to form a first data set from the first excitation;
recording a second reflected waveform with the second transducer to form a second data set from the second excitation;
averaging the first data set to form an average reflection amplitude of the first transducer;
averaging the second data set to form an average reflection amplitude of the second transducer;
estimating a first sensitivity correction factor for the first data set by dividing the average reflection amplitude of the first transducer by the sum of the average reflection amplitude of the first transducer and average reflection amplitude of the second transducer;
applying the first sensitivity correction factor to at least a portion of the first data set to form a first sensitivity corrected data set;
estimating a second sensitivity correction factor for the second data set by dividing the average reflection amplitude of the second transducer by the sum of the average reflection amplitude of the first transducer and average reflection amplitude of the second transducer;
applying the second sensitivity correction factor to at least a portion of the second data set to form a second sensitivity corrected data set;
stacking the first sensitivity corrected data set amplitudes to form a first image;
stacking the second sensitivity corrected data set amplitudes to form a second image;
comparing the first image and the second image; and
displaying the first image and the second image at a common depth and an azimuth window.

7. The method of claim 6, further comprising calculating the first sensitivity correction factor and the second sensitivity correction factor at a beginning of a drilling run or end of the drilling run.

8. The method of claim 6, further comprising calculating the first sensitivity correction factor and the second sensitivity correction factor is applied over any length of a drilling run.

9. The method of claim 6, further comprising updating the first sensitivity correction factor and the second sensitivity correction factor at a designated depth.

10. The method of claim 6, further comprising updating the first sensitivity correction factor and the second sensitivity correction factor over a drilling run at any designated depth.

11. The method of claim 6, wherein the first excitation and the second excitation are a pressure pulse.

12. A system comprising:
a measurement assembly comprising:
  a first transducer connected to the measurement assembly and configured to transmit a first excitation; and
  a second transducer connected to the measurement assembly and configured to transmit a second excitation; and
an information handling system configured to:
  record a first reflected waveform with the first transducer to form a first data set from the first excitation;
  record a second reflected waveform with the second transducer to form a second data set from the second excitation;
  average the first data set to form an average reflection amplitude of the first transducer;
  average the second data set to form an average reflection amplitude of the second transducer;
  estimate a first sensitivity correction factor for the first data set by dividing the average reflection amplitude of the first transducer by the sum of the average reflection amplitude of the first transducer and average reflection amplitude of the second transducer;
  apply the first sensitivity correction factor to at least a portion of the first data set to form a first sensitivity corrected data set;
  estimate a second sensitivity correction factor for the second data set by dividing the average reflection amplitude of the second transducer by the sum of the average reflection amplitude of the first transducer and average reflection amplitude of the second transducer;
  apply the second sensitivity correction factor to at least a portion of the second data set to form a second sensitivity corrected data set;
  stack the first sensitivity corrected data set amplitudes to form a first image;
  stack the second sensitivity corrected data set amplitudes to form a second image; and
  compare the first image and the second image.

13. The system of claim 12, wherein the first excitation and the second excitation is a pressure pulse.

14. The system of claim 12, wherein the information handling system is further configured to display the first image and the second image at a common depth and an azimuth window.

15. The system of claim 12, wherein the information handling system is further configured to identify a borehole radius from a fluid sound speed calculation.

16. The system of claim 12, wherein the information handling system is further configured to calculate the first sensitivity correction factor and the second sensitivity correction factor at a designated depth.

17. The system of claim 12, wherein the information handling system is further configured to calculate the first sensitivity correction factor and the second sensitivity correction factor before beginning a drilling run or after the drilling run.

18. The system of claim 12, wherein the information handling system is further configured to re-calculate the first sensitivity correction factor and the second sensitivity correction factor over a drilling run at any designated depth.

19. The system of claim 12, further comprising a conveyance, wherein the measurement assembly is connected to the conveyance.

20. The system of claim 19, wherein the conveyance comprises a wireline, a slickline, coiled tubing, a drill pipe, or a downhole tractor.

* * * * *